US 6,722,744 B1

United States Patent
Shieh

(10) Patent No.: US 6,722,744 B1
(45) Date of Patent: Apr. 20, 2004

(54) QUICK-RELEASE DEVICE FOR A GOLF CART WHEEL

(76) Inventor: Shanq-Ching Shieh, 6 Fl., No. 105, Yung-An St., Yuanlin Chen, Changhua Hsien (TW)

( * ) Notice: Subject to any disclaimer, the term of this patent is extended or adjusted under 35 U.S.C. 154(b) by 0 days.

(21) Appl. No.: 10/367,836

(22) Filed: Feb. 19, 2003

(51) Int. Cl.$^7$ ................................................ B60B 35/00
(52) U.S. Cl. .............. 301/119; 301/111.01; 301/111.06; 301/111.07
(58) Field of Search ........................... 301/111.01, 119, 301/121, 111.05, 111.06, 111.07, 112, 120, 122, 111.03, 111.04

(56) References Cited

U.S. PATENT DOCUMENTS

| | | | | |
|---|---|---|---|---|
| 982,745 A | * | 1/1911 | Rice | 301/121 |
| 1,067,367 A | * | 7/1913 | Noster | 301/119 |
| 1,567,638 A | * | 12/1925 | Dean | 301/110.5 |
| 1,784,330 A | * | 12/1930 | Bowers | 301/121 |
| 6,024,416 A | * | 2/2000 | Chen et al. | 301/121 |
| 6,120,106 A | * | 9/2000 | Liao | 301/111.06 |
| 6,234,582 B1 | * | 5/2001 | Wu | 301/111.06 |
| 6,520,598 B1 | * | 2/2003 | Cheng | 301/111.01 |
| 6,523,910 B1 | * | 2/2003 | Lin | 301/111.06 |

* cited by examiner

Primary Examiner—Russell D. Stormer
(74) Attorney, Agent, or Firm—Bacon & Thomas, PLLC

(57) ABSTRACT

A quick-release device for a golf cart wheel has a housing, an lock, a locking lever and a latch. A locking cavity is defined in the housing. The lock has a locking arm and is pivotally attached to the housing. The locking lever is pivotally attached to the housing and has a tongue corresponding to the lock. The latch is detachably inserted into the locking cavity of the housing and has an annular recess corresponding to the locking arm of the lock. The housing and the latch are respectively connected to the frame and the wheel of the golf cart. Accordingly, the wheel can be conveniently attached to or detached from the frame of the golf cart, and operation of the quick-release device is easy and convenient.

14 Claims, 6 Drawing Sheets

QUICK-RELEASE DEVICE FOR A GOLF CART WHEEL

BACKGROUND OF THE INVENTION

1. Field of the Invention

The present invention relates to a quick-release device, and more particularly to a quick-release device for a golf cart wheel, which has a simple structure and is easy to operate.

2. Description of Related Art

Golf is a popular pastime and exercise, and multiple golf clubs are required to play golf. However, carrying many golf clubs is a heavy burden for a golfer. Therefore, most golfers use a golf cart to carry a golf bag with the golf clubs.

With reference to FIG. 6, the conventional golf cart in accordance with the prior art comprises a frame (50), a handle (52) and two wheels (54). The golf club bag is mounted on the frame (50), and the handle (52) is attached to the frame (50) and is pulled or pushed by the golfer. The wheels (54) are rotatably attached to the frame (50), such that the golfer can move the golf cart easily to any desired place on the golf course. To reduce space required for storing or transporting the golf cart when the golf cart is not in use, the handle (52) and the wheels (54) are always designed to be foldable relative to or detachable from the frame (50). A means of mounting or removing each wheel is arranged between the frame (50) and each wheel (54). The conventional means of mounting or removing each wheel comprises an axle (not numbered), a hub (not numbered) and a screw (not shown). The axle is attached to the frame (50), and the hub is rotatably connected to the wheel (54). The axle is inserted into the hub. The screw has a free end that is screwed into the hub and abuts the axle. Accordingly, the wheel (54) is rotatably connected to the frame (50) by the means of mounting or removing each wheel. When the screw is unscrewed, the axle can be released from the hub so the wheel (54) can be removed from the frame (50).

However, the operation of the conventional engaging device is troublesome because the screw must be rotated to lock or to release the conventional means of mounting or removing each wheel.

To overcome the shortcomings, the present invention provides a quick-release device to mitigate or obviate the aforementioned problems.

SUMMARY OF THE INVENTION

The main objective of the invention is to provide a means of mounting or removing each wheel of a golf cart that is easy to operate. The means of mounting or removing each wheel of a golf cart has a housing, a lock, a locking lever and a latch. The lock and the locking lever are pivotally mounted in the housing. The housing is attached to the frame of the golf cart. The latch is attached to the wheel. The latch can be inserted into and locked in the housing by the lock or released from the housing and removed from the housing. With such a means of mounting or removing each wheel of a golf cart, the wheels can be quickly and conveniently attached to or detached from the frame of the golf cart.

Other objectives, advantages and novel features of the invention will become more apparent from the following detailed description when taken in conjunction with the accompanying drawings.

DETAILED DESCRIPTION OF PREFERRED EMBODIMENT

Figure 1:
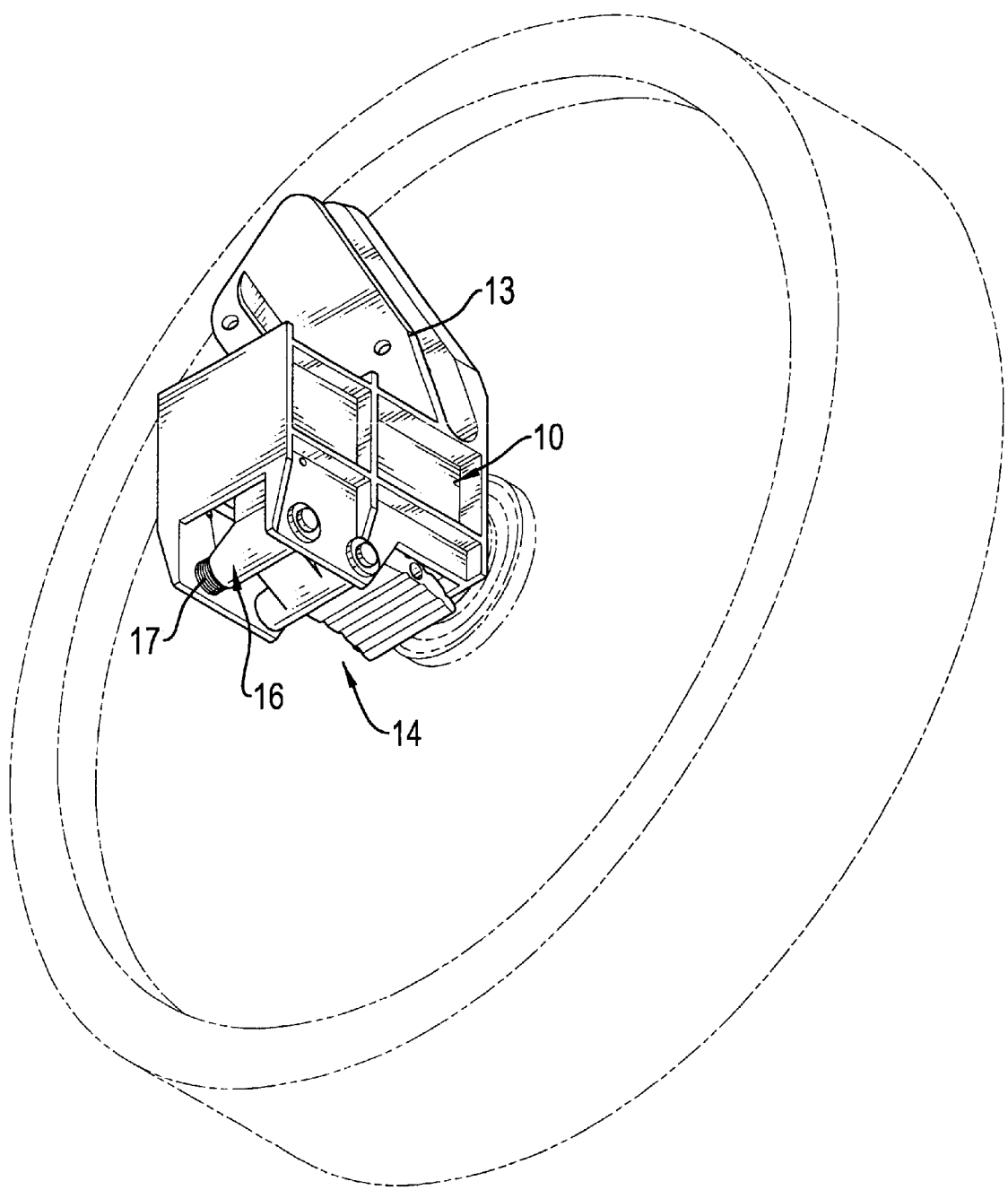
FIG. 1 is a perspective view of a wheel with a first embodiment of a quick-release device for a golf cart wheel in accordance with the present invention.
Figure 2:
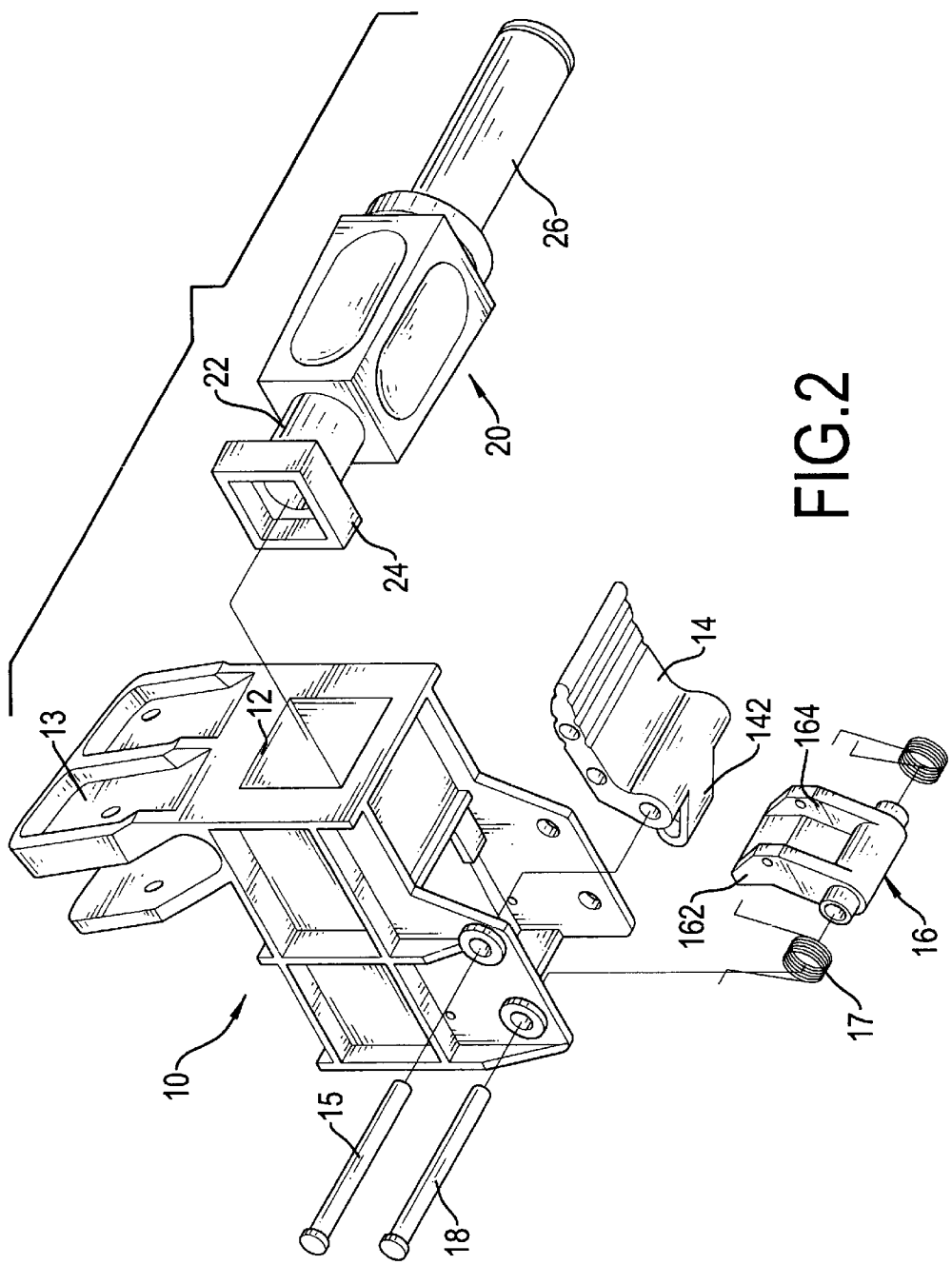
FIG. 2 is an exploded perspective view of the quick-release device for a golf cart wheel in FIG. 1.

With reference to FIGS. 1 and 2, a quick-release device for a golf cart wheel in accordance with the present invention comprises a housing (10), a lock (16), a locking lever (14) and a latch (20). The housing (10) has a top (not numbered), a bottom (not numbered), an open end (not numbered), a closed end (not numbered), a locking cavity (12), two parallel wings (not numbered) and a bracket (13). The wings are formed on opposite sides of and extend down from the bottom of the housing (10). Two pivot holes (not numbered) are formed in each wing to mount the lock (16) and the locking lever (14). A first pinhole (not numbered) is formed in each wing. An opening (not numbered) is formed in the bottom of the housing (10) between the wings to allow the lock (16) to extend into the locking cavity (12). The bracket (13) is formed on the top of the housing (10) and is adapted to connect the housing (10) to a frame of a golf cart. In practice, the bracket (13) comprises two parallel plates extending from the top of the housing (10) in parallel and adapted to connect to the frame of the golf cart. The locking cavity (12) communicates with the open end of the housing (10) and the opening in the bottom of the housing (10).

The lock (16) has a transverse tubular end (not numbered), a locking arm (162), a first pivot pin (18) and two springs (17). The tubular end has two ends (not numbered), a transverse through hole (not numbered) and a tubular neck (not numbered) extending from each end of the transverse tubular end. The first pivot pin (18) passes through one of the pivot holes in one wing, the transverse through hole and the corresponding pivot hole in the other wing to pivotally attach the lock (16) to the housing (10). The locking arm (162) has a contact side (not numbered) and an actuating side (not numbered) and is formed on and extends radially from the tubular end of the lock (16). The actuating side has an actuating recess (164) and two sidewalls (not numbered). The sidewalls are formed respectively on opposite sides of the locking arm (162). A second pinhole (not numbered) is formed transversely through each sidewall. Two springs (17) are mounted respectively around the necks at the opposite ends of the tubular through hole in the lock (16). Each spring (17) has two ends respectively mounted in the first pinhole in the corresponding wing extending from the housing (10) and the second pinhole in the sidewall of the locking arm (162) of the lock (16) to hold the locking arm (16) out of the hole in the bottom of the housing (10).

The locking lever (14) has a transverse tubular section (not numbered), a tongue (142), a tab (not numbered) and a second pivot pin (15). A transverse through hole (not numbered) is formed through the transverse tubular section. The second pivot pin (15) passes through one of the pivot holes in one wing, the transverse through hole and the corresponding pivot hole in the other wing to pivotally attach the locking lever (14) to the housing (10). The tongue (142) is formed on and extends radially from the transverse tubular section of the locking lever (14). The tab is formed on extends radially from the transverse tubular section opposite to the tongue (142). When the locking lever (14) is pivotally mounted between the wings, the tongue (142) corresponds to the actuating recess (164) in the locking arm (164).

The latch (20) has a distal end (not numbered), a proximal end (not numbered), a body (not numbered), an annular recess (22) and a head (24). The body is at the proximal end that is securely attached to a wheel axle (26). A wheel (not numbered) is rotatably mounted on the wheel axle (26). The head (24) is formed at the distal end of the latch (20), and the annular recess (22) is formed between the body and the head (24). The distal end of the latch (20) is detachably inserted into the open end of the locking cavity (12) in the housing (10) until the locking arm (162) can engage the locking recess (22) and hold the head (24) in the locking cavity (12).

Figure 3:
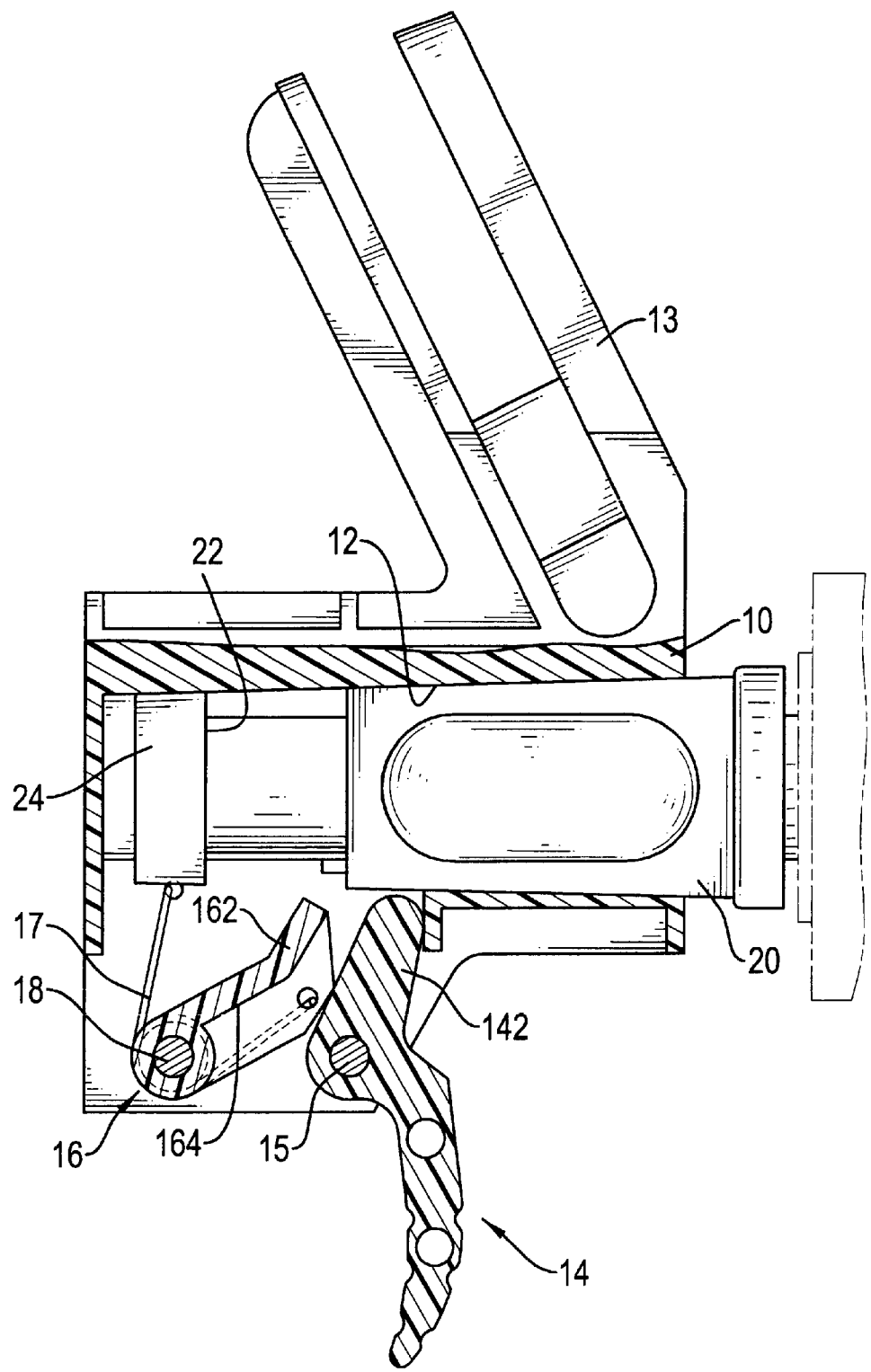
FIG. 3 is a side plan view in partial section of the quick-release device for a golf cart wheel in FIG. 1 with the lock disengaged.
Figure 4:
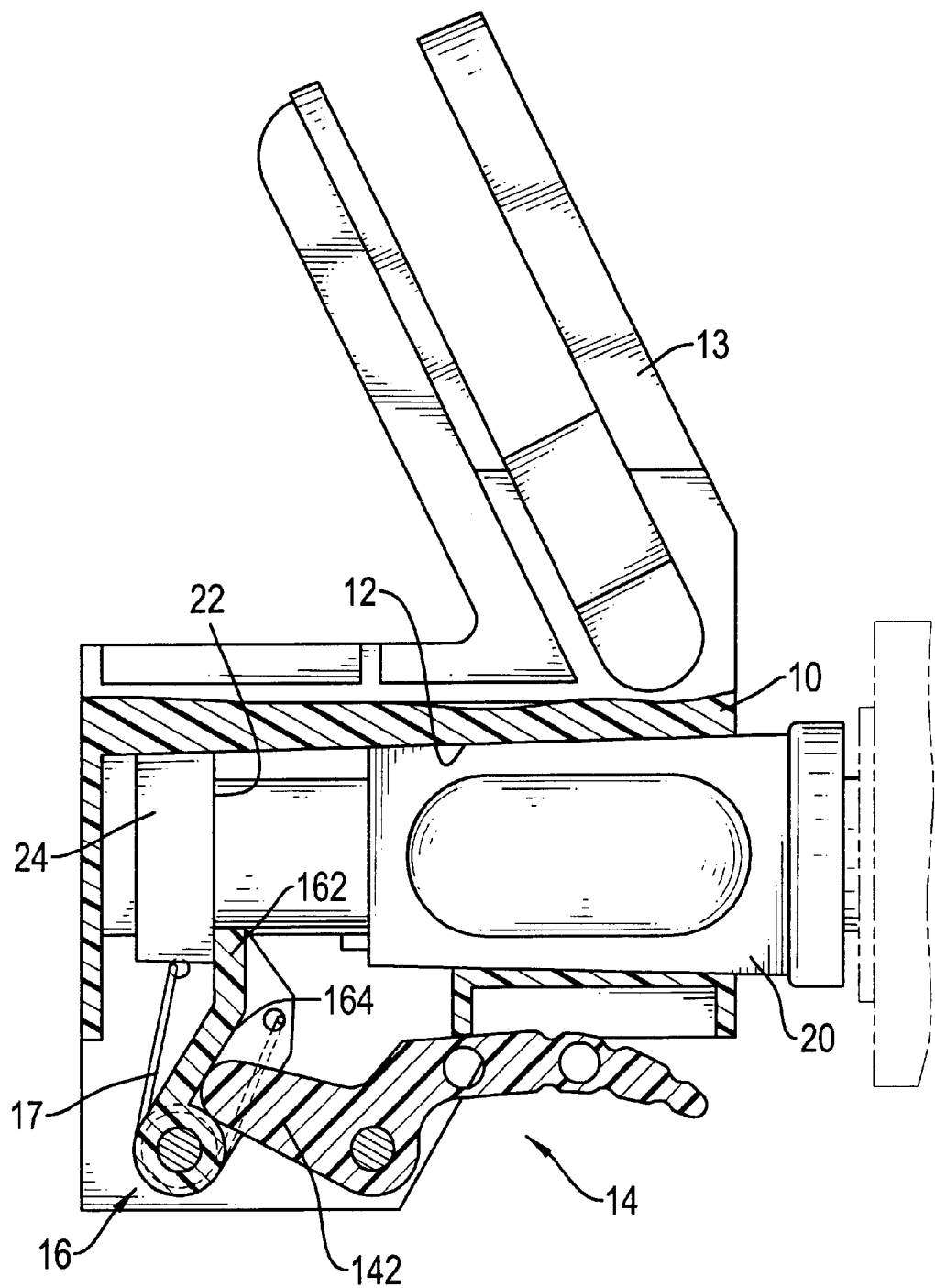
FIG. 4 is a side plan view in partial section of the quick-release device for a golf cart wheel in FIG. 1 with the lock engaged.

With reference to FIGS. 3 and 4, the annular recess (22) aligns with the opening in the bottom of the housing (10) when the latch (20) is inserted completely into the locking cavity (12). When the tab on the locking lever (14) is pivoted toward the housing (10), the tongue (142) will engage and push the actuating recess (164) in the locking arm (162) of the lock (16). As the lock (16) pivots, the locking arm (162) extends into the locking cavity (12). and engages the annular recess (22) in the latch (20). With the locking lever (14) fully depressed against the housing (10), the tongue (142) securely holds the locking arm (162) in the annular recess (22) against the head (24) of the latch (20). Accordingly, the wheel is rotatably connected to the frame by the quick-release device.

When the tab of the locking lever (14) is pivoted away from the housing (10), the tongue (142) will release the locking arm (162), and the springs (17) will pivot the locking arm (162) out of the locking cavity and release the latch (20). Accordingly, the wheel can be removed by pulling the latch (20) out of the locking cavity (12) in the housing (10). Removing the wheels from the frame significantly reduces space required for storing or transporting the golf cart.

With such an engaging device, the wheel can be easily and conveniently attached to or detached from the frame of the golf cart. The operation of the engaging device is simple and efficient.

Figure 5:
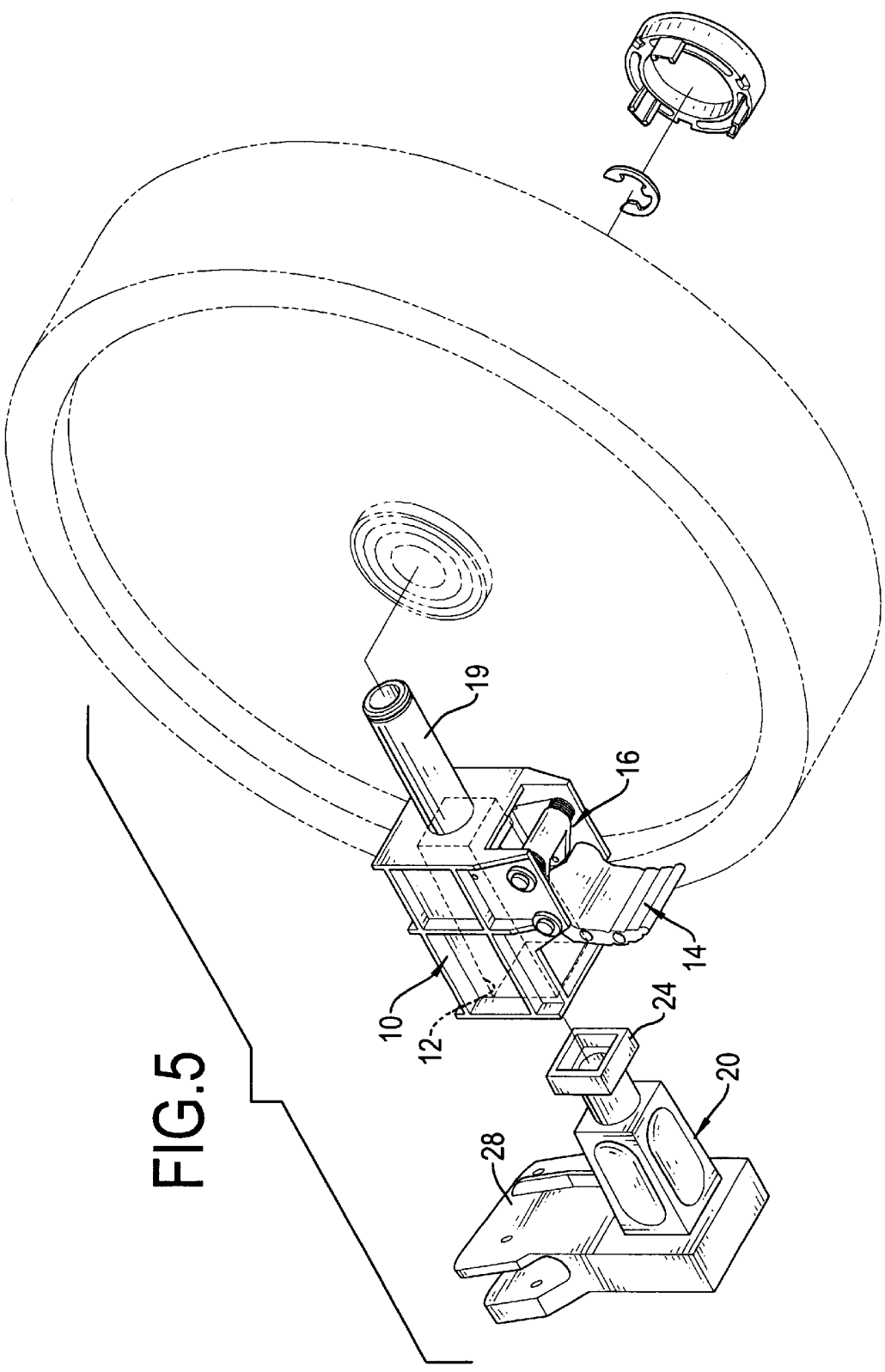
FIG. 5 a partially exploded perspective view of a second embodiment of a quick-release device for a golf cart wheel in accordance with the present invention.
Figure 6:
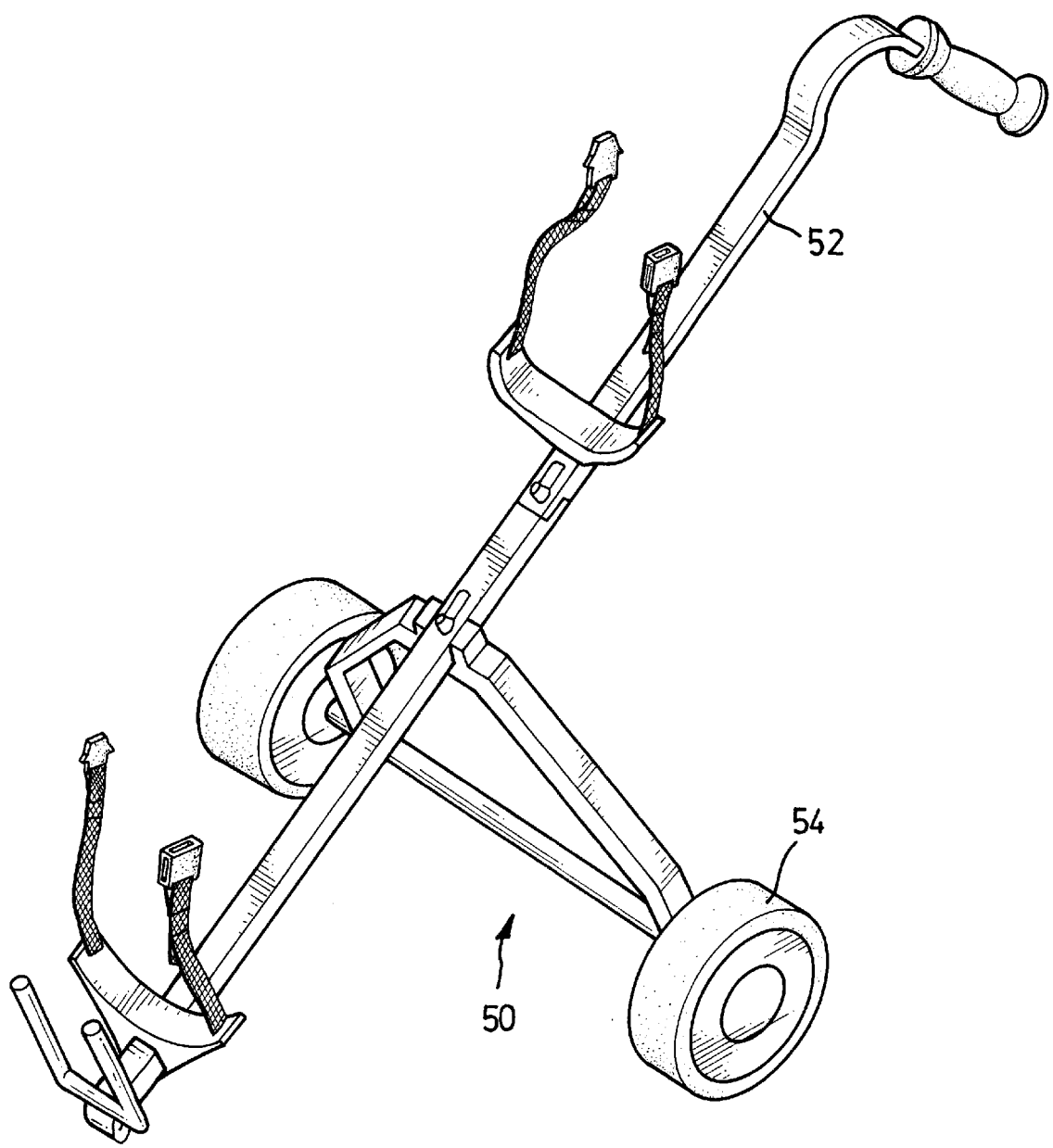
FIG. 6 is a perspective view of a conventional golf cart in accordance with e prior art.

With reference to FIG. 5, another embodiment of a quick-release device for a golf cart wheel in accordance with the present invention is the same as the previous embodiment except the latch (20) is adapted to attach to the frame of the golf cart and the housing (10) is adapted to connect to the wheel. A bracket (28) similar to the bracket (13) in the first embodiment is composed of two parallel connecting plates, is attached to the proximal end of the latch (20) and is adapted to attach to the frame of the golf cart. A wheel axle (19) is securely attached to and extends from the closed end of the housing (10) and is adapted to rotatably mount the wheel. With the quick-release device as described, the wheel can be efficiently attached to or detached from the frame.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A quick-release device for a golf cart wheel from a golf cart with a frame, the quick-release device comprising:
    a housing having a top, a bottom, a closed end, a locking cavity defined in an end of the housing away from the closed end and a bracket mounted on the housing and adapted to connect to the frame of the golf cart;
    a lock pivotally attached to the housing and having an locking arm formed on one end of the lock and selectively extending into the locking cavity;
    a locking lever pivotally attached to the housing and having a tongue formed on one end of the locking lever and corresponding to the lock to press the locking arm of the lock into the locking cavity;
    at least one spring mounted between the housing and the lock to provide a recoil force to the lock;
    a latch detachably inserted into the locking cavity in the housing, and the latch having an annular recess defined near one end of the latch and corresponding to the locking arm of the lock to engage with the locking arm of the lock when the locking arm of the lock is pressed into the locking cavity; and
    a wheel axle securely attached to and extending from the end of the latch far from the annular recess and adapted to rotatably mount the wheel.

2. The quick-release device as claimed in claim 1, wherein the bracket comprises two plates extending from the housing in parallel and adapted to connect to the frame of the golf cart.

3. The quick-release device as claimed in claim 1, wherein the locking lever has a middle; and
    a pivot pin passing through the housing and the middle of the locking lever to pivotally attach the locking lever to the housing.

4. The quick-release device as claimed in claim 1 further comprising a pivot pin passing through the housing and one end of the lock far from the locking arm to pivotally attach the lock to the housing.

5. The quick-release device as claimed in claim 4, wherein each at least one spring is mounted around the pivot pin and has two ends respectively connected to the housing and the lock.

6. The quick-release device as claimed in claim 5, wherein an actuating recess is defined in the lock and corresponds to the tongue of the locking lever.

7. The quick-release device as claimed in claim 1, wherein the annular recess is defined around the latch to form a head at the end of the latch.

8. A quick-release device for a golf cart wheel from a golf cart with a frame, the quick-release device comprising:
    a housing having a top, a bottom, a closed end a locking cavity defined in an end of the housing away from the close end and a wheel axle securely attached to and extending from the closed end of the housing and adapted to rotatably mount the wheel;
    a lock pivotally attached to the housing and having an locking arm formed on one end of the lock and selectively extending into the locking cavity;
    a locking lever pivotally attached to the housing and having a tongue formed on one end of the locking lever and corresponding to the lock to press the locking arm of the lock into the locking cavity;

at least one spring mounted between the housing and the lock to provide a recoil force to the lock;

a latch detachably inserted into the locking cavity in the housing, and the latch having an annular recess defined near one end of the latch and corresponding to the locking arm of the lock to engage with the locking arm of the lock when the locking arm of the lock is pressed into the locking cavity; and a bracket extending from the latch and adapted to connect to the frame of the golf cart.

9. The quick-release device as claimed in claim 8, wherein the bracket comprises two plates extending from the latch in parallel and adapted to connect to the frame of the golf cart.

10. The quick-release device as claimed in claim 8, wherein the locking lever has a middle; and a pivot pin passing through the housing and the middle of the locking lever to pivotally attach the locking lever to the housing.

11. The quick-release device as claimed in claim 8 further comprising a pivot pin passing through the housing and one end of the lock far from the locking arm to pivotally attach the lock to the housing.

12. The quick-release device as claimed in claim 11, wherein each at least one spring is mounted around the pivot pin and has two ends respectively connected to the housing and the lock.

13. The quick-release device as claimed in claim 12, wherein an actuating recess is defined in the lock and corresponds to the tongue of the locking lever.

14. The quick-release device as claimed in claim 8, wherein the annular recess is defined around the latch to form a head at the end of the latch.

* * * * *